United States Patent [19]

Suzuki et al.

[11] 3,766,408

[45] Oct. 16, 1973

[54] COUNTER USING INSULATED GATE FIELD EFFECT TRANSISTORS

[75] Inventors: Yasoji Suzuki, Kawasaki; Masataka Hirasawa, Kohoku-ku, Yokohama, both of Japan

[73] Assignee: Tokyo Shibaura Electric Co., Ltd., Kawasaki-shi, Japan

[22] Filed: May 3, 1972

[21] Appl. No.: 249,803

[30] Foreign Application Priority Data

May 7, 1971 Japan .............................. 46/30268
July 28, 1971 Japan .............................. 46/55928

[52] U.S. Cl. .......... 307/223 C, 307/223 R, 307/279
[51] Int. Cl. .......................................... H03k 27/00
[58] Field of Search .................... 307/223 C, 223 R, 307/225 C, 221 C

[56] References Cited

UNITED STATES PATENTS

| | | | |
|---|---|---|---|
| 3,345,574 | 10/1967 | Hilberg | 307/223 R |
| 3,639,740 | 2/1972 | Escoffier | 307/223 R |
| 3,641,370 | 2/1972 | Heimbigner | 307/223 C |

*Primary Examiner*—John S. Heyman
*Attorney*—Irving M. Weiner et al.

[57] ABSTRACT

An *n*-scale counter comprising first memory cells or shift registers cascade connected in a number of (*n*-2), one second memory cell or shift register and one inverter circuit. Each of the first memory cells has first and second input terminals and one output terminal. While an input signal to the second or reset terminal has a first voltage level, an input signal applied to the first input terminal is taken out as an output signal at the output terminal with a delay of a predetermined length of time, and while an input signal to the reset terminal has a second voltage level, an output signal from the output terminal is reset. The second memory cell has one input terminal and one output terminal so as to cause a signal supplied to input terminal to be taken out as an output signal at the output terminal with a delay of a predetermined length of time. The second memory cell and inverter are connected between the foremost and rearmost units of the first memory cell assembly, and the junction of the second memory cell and the inverter circuit is connected to the respective second input terminals of the first memory cells.

28 Claims, 22 Drawing Figures

PATENTED OCT 16 1973

3,766,408

SHEET 09 OF 19

COUNTER USING INSULATED GATE FIELD EFFECT TRANSISTORS

This invention relates to a counter and more particularly to a counter so arranged as to permit the easy integration of circuits.

Recent prominent progress in the technique of integrating circuits has considerably reduced the size of constituent elements being included therein, realizing the increased functions of circuits integrated within a semiconductor chip having a predetermined surface area. Further, a semiconductor wafer and in consequence a semiconductor chip capable of high yield manufacture have come to be more enlarged in surface area. This has led to the prominently increased functions of integrated circuits and made possible the large seale integration within a single semiconductor chip of a large number of various circuits having ununiform complicated functions. Thus, numerous circuits used, for example, in an electronic desk top type calculator can be compactly integrated in a few semiconductor chips. This holds true with an $n$-scale counter used in a timing counter or address counter indispensable to an electronic computer.

An $n$-scale counter generally has a $(n-1)$ number of cascade connected flip-flip circuits, output signals from which are fed back to the foremost or first bit flip-flop circuit through an AND gate and inverter. Only one of the $(n-1)$ number of flip-flop circuits normally remains in a set position and the remainder in a reset position. During operation the set position is shifted through the assembly of the flip-flop circuits by clock pulses.

An $n$-scale counter of the above-mentioned arrangement requires a $(n-1)$ number of feedback signals, so that as the $n$ has a larger value, the feedback signal conductors occupy an increasing space. Now let it be assumed that $n$ is 16, the feedback conductor has a width of 8 microns and the interconductor space is 8 microns. Then for feedback signals, there will be required a space as wide as $15 \times 2 \times 8 = 240$ microns. This space even corresponds to over two-thirds of the space occupied by the other circuits than those of the feedback signals. Accordingly, a counter using numerous feedback signals is not deemed preferable for integration of circuits.

With the prior art counter an increasing value of $n$, that is, a large number of bits, makes it necessary to enlarge the size of constituent elements substantially in proportion to the value of $n$ and consequently consume more power in proportion to the value of $n^2$.

Accordingly, an object of this invention is to provide a counter adapted for integration of circuits by minimizing the required number of feedback signals.

Another object of the invention is to provide a counter capable of being operated with small power consumption, though a large number of bits may have to be handled.

According to this invention there is provided an $n$-scale counter comprising: first memory cells each having first and second input terminals and one output terminal and cascade connected in a number of $n-2$, the output terminal of the first memory cell being connected to the first input terminal of the next subsequent one, the first memory cell taking out as an output signal at the output terminal an input signal to the first input terminal with a delay of a predetermined length of time, when the second input terminal is at a first voltage level, and resetting an output signal at the output terminal, when the second input terminal is at a second voltage level; a second memory cell having one input terminal and one output terminal and interposed between the foremost and rearmost units of the first cascade connected memory cells, the second memory cell taking out as an output signal at the output terminal an input signal to the input terminal with a delay of a predetermined length of time; an inverter circuit connected in series to the second memory cell between the foremost and rearmost units of the first cascade connected memory cells; and means for connecting the junction of the inverter circuit and the second memory cell to the second input terminals of the first memory cells.

While a counter according to this invention, therefore, there is required only one feedback signal regardless of the value of $n$ and consequently the width of a necessary conductor has only to be about 16 microns, which can be well overlooked as compared with the spaces occupied by the other elements. Further, the output terminal of the $(n-1)$ order unit of the first memory cell assembly is provided with a buffer circuit, enabling the size of the other constituent elements to be reduced, independently of the value of $n$. Provided the buffer circuit or the constituent element of the rearmost unit is allowed to have a sufficiently large size, the constituent elements of the other memory cells may be reduced in size, enabling the subject counter to be operated with small power consumption which can be decreased substantially in proportion to the value of $n$.

The present invention can be more fully understood from the following detailed description when taken in connection with reference to the accompanying drawings, in which.

Figure 13:
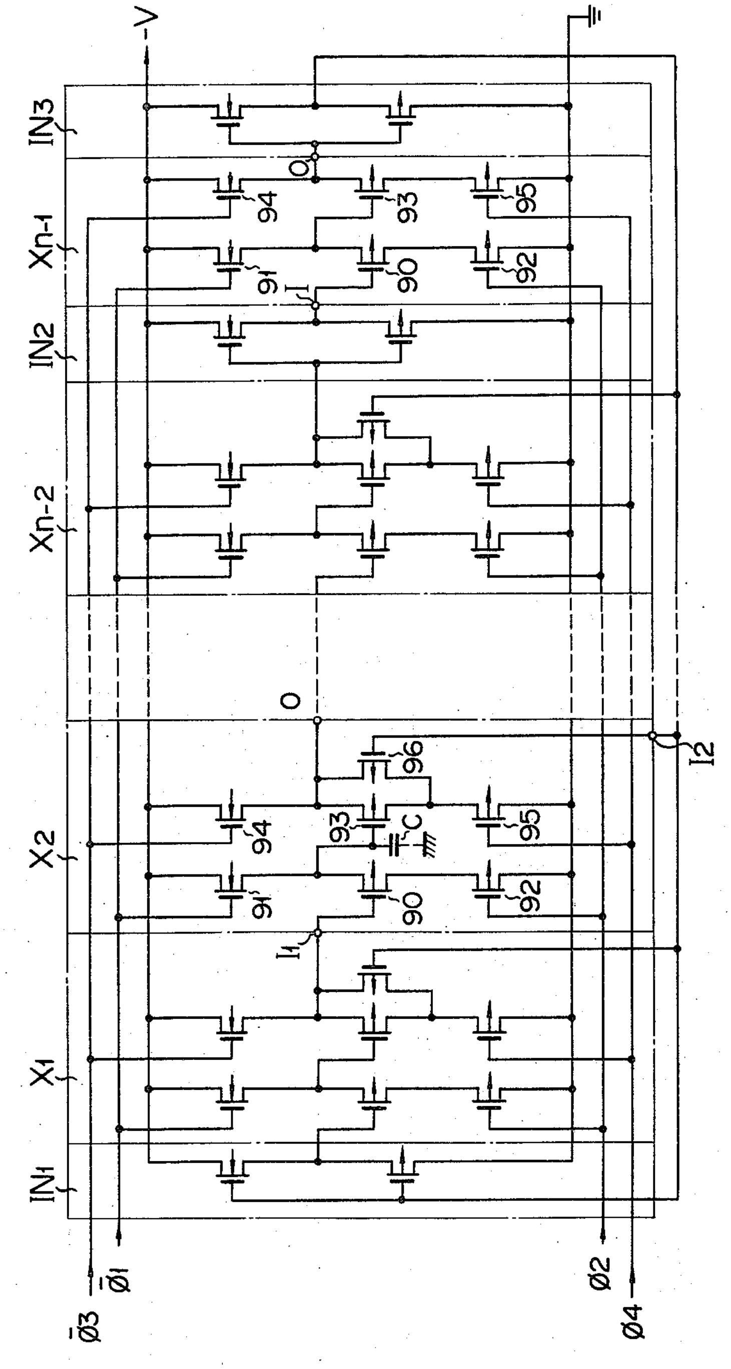
FIG. 13 is a circuit diagram of an n-scale dynamic counter using 4-phase clock signals, the counter corresponding to the counter of FIG. 3.
Figure 14:
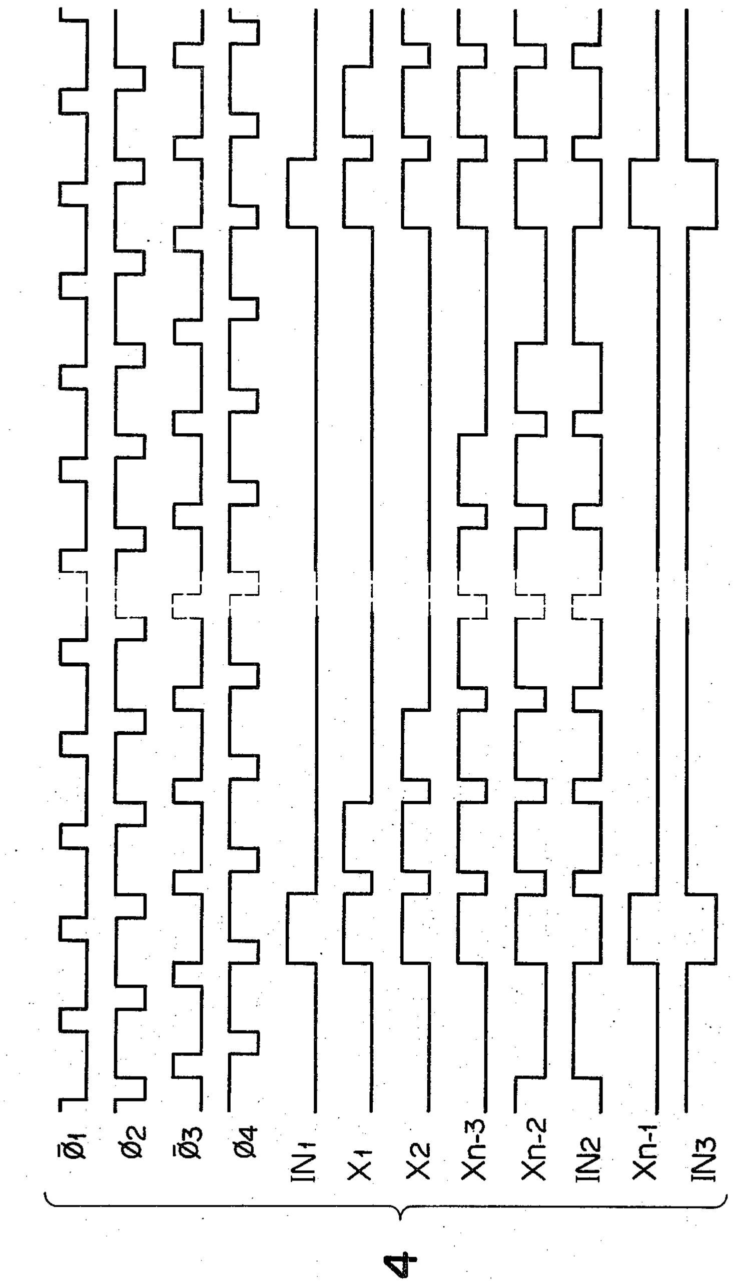
Figure 15:
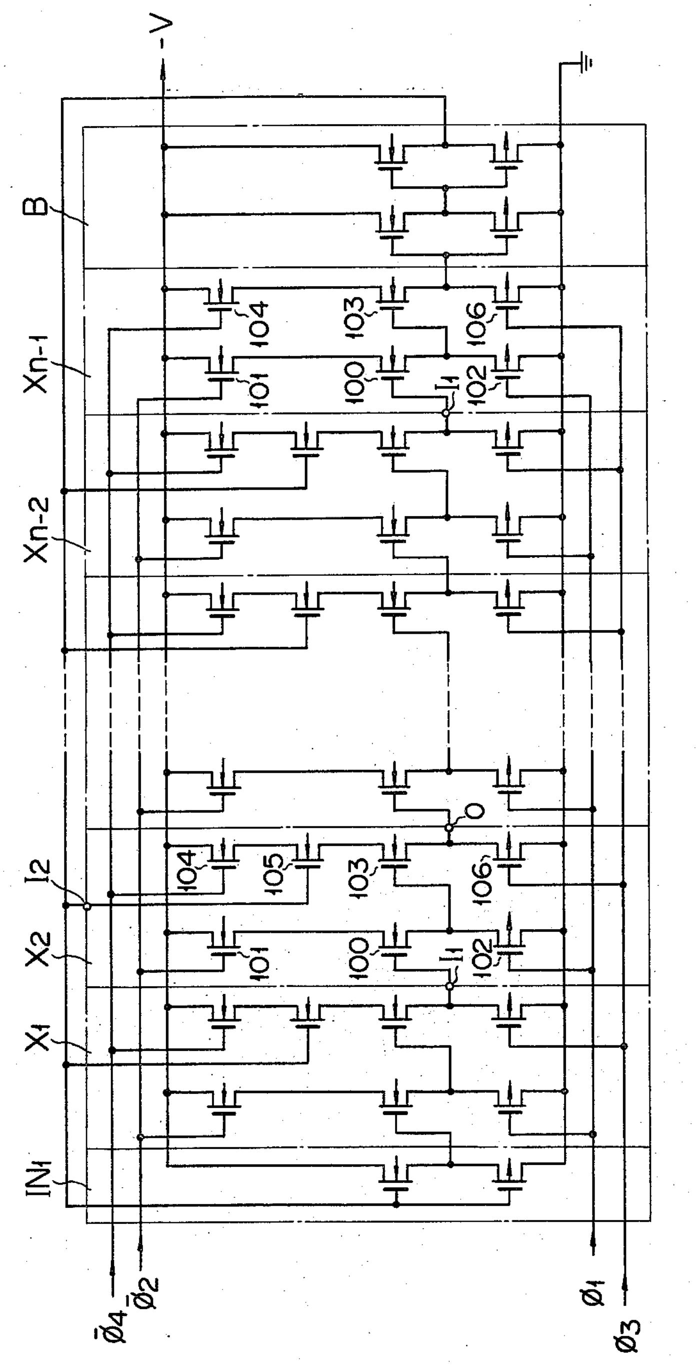

FIG. 14 indicates the wave forms of clock pulses used in the counter of FIG. 13 and those of output signals generated from the various units of the counter; and FIG. 15 is a modification of FIG. 13.

Throughout the embodiments described below, there is used a negative logic. Consequently, negative voltage is designated as logic "1" and zero voltage as logic "0". Further, all these embodiments are formed of insulated gate field effect transistors (hereinafter referred to as "MOS FET's") adapted for use with integrated circuits. Connection of the substrates of the FET's is omitted to simplify the drawings, because the connection system is well known to those skilled in the art.

Figure 1A:
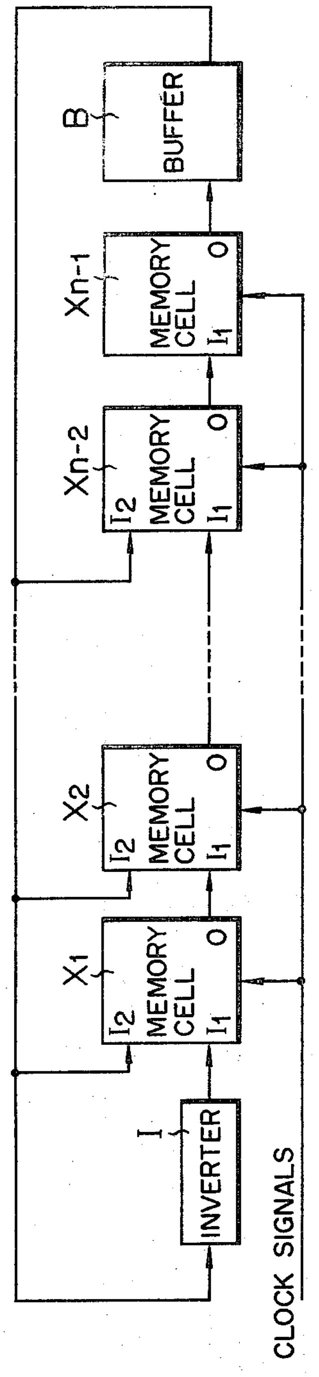
FIG. 1A is a block diagram of an n-scale dynamic counter according to an embodiment of this invention.

As seen from FIG. 1A, there are cascade connected a ($n-2$) number of first memory cells $X_1$ to to $X_{n-2}$ each having first and second input terminals $I_1$ and $I_2$ and an output terminal 0. The first memory cells $X_1$ to $X_{n-2}$ have the output terminals 0 connected to the respective first input terminals of the succeeding ones in turn. However, the rearmost unit or stage $X_{n-2}$ of the first memory cell assembly has its output terminal 0 connected to the input terminal $I_1$ of a second memory cell $X_{n-1}$. The output terminal 0 of the second memory cell $X_{n-1}$ is connected to the input terminal $I_1$ of the foremost unit or stage $X_1$ of the first memory cell assembly through a buffer B and inverter circuit I. The junction of the buffer B and inverter circuit I is connected to the respective second input terminals $I_2$ of the first memory cells $X_1$ to $X_{n-2}$. The buffer B is provided, if required, to supply driving power to feedback signals from the second memory cell $X_{n-1}$ to the first memory cells $X_1$ to $X_{n-2}$.

The first and second memory cells are supplied with clock pulses. In the second memory cell $X_{n-1}$, a signal supplied to its input terminal $I_1$ is produced at its output terminal 0 with a delay of a one-bit time determined by the clock pulses. In each of the first memory cells as in the second memory cell, a signal supplied to its first input terminal $I_1$ is taken out as an output signal at its output terminal 0 generally with a delay to a one-bit time according to the form of feedback signals supplied to its second input terminal $I_2$. In the first memory cells, when a feedback signal supplied to the second input terminals $I_2$ changes in the logic state, then an output therefrom is reset regardless of the conditions of the first input terminals and the clock pulses supplied to the cells.

Figure 1B:
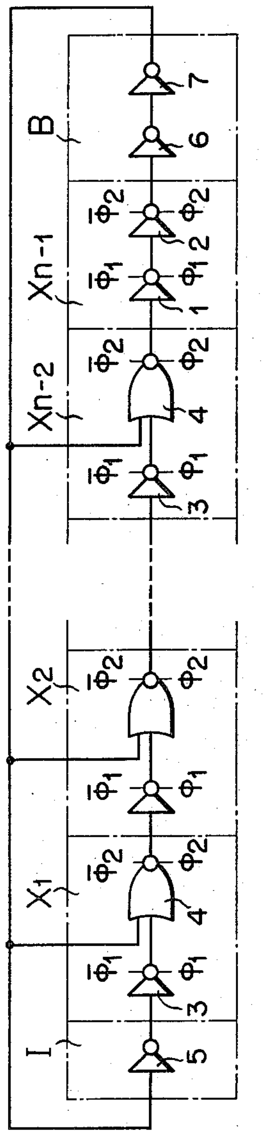
FIG. 1B is a logic diagram of the counter of FIG. 1A, where there are used complementary insulated gate field effect transistor assembly.

FIG. 1B is a logic diagram of FIG. 1A where inverter means used as constituent element in the counter consists of complementary insulated gate field effect transistor assemble, or the so-called C-MOS FET's. The second memory cell $X_{n-1}$ includes first and second inverter means 1 and 2. The first inverter means 1 inverts an output from the rearmost unit $X_{n-2}$ of the first memory cell assembly in synchronization with a first clock signal $\phi_1$ and its complement $\overline{\phi_1}$. The second inverter means 2 inverts an output from the first inverter means 1 in synchronization with a second clock signal $\phi_2$ and its complement $\overline{\phi_2}$. The time interval of the respective first and second clock signals $\phi_1$ and $\phi_2$ corresponds to a one-bit time interval, and the time interval between clock signals $\phi_1$ and $\phi_2$ corresponds to a half-bit time interval. Accordingly, the second memory cell $X_{n-1}$ is a one-bit shift register or delayed flip-flop, wherein an input signal thereto is taken out as an output signal with a delay of a one-bit time interval.

Though constructed substantially on the basis of the second memory cell $X_{n-1}$, the first memory cells are so designed as to have the output forcefully reset by a feedback signal and consequently are each provided with inverter means 3 corresponding to the first inverter means 1 and NOR means 4 which is supplied with an output from the first mentioned inverter means 3 as well as with a feedback signal. Where the feedback signal represents the logic 0, then the NOR means 4 simply acts as inverter means, causing the first memory cells to be operated exactly in the same manner as the second memory cell. However, where the feedback signal is changed to the logic 1, then the NOR means has its output reset, that is, converter to the logic 0. The inverter circuit I has a single inverter means 5, and the buffer B has two serially arranged inverter means 6 and 7.

Figure 2A:
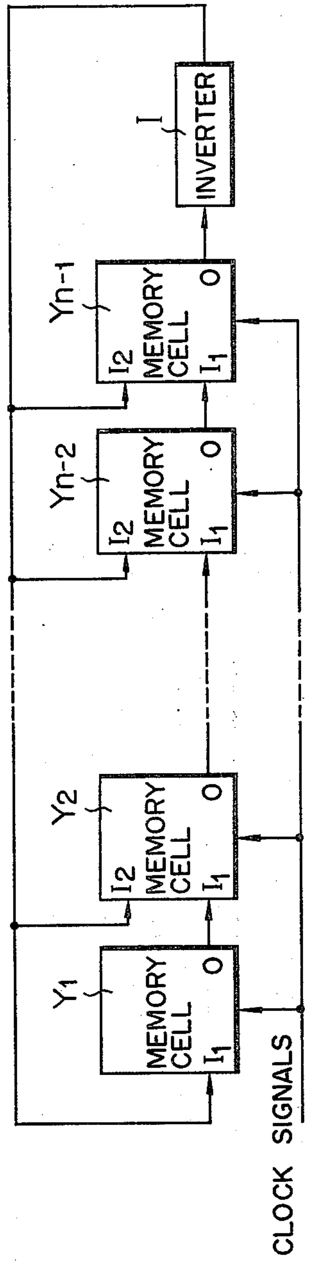
FIG. 2A is a block circuit diagram of an $n$-scale dynamic counter according to another embodiment of the invention.

FIG. 2A is a block diagram of a counter according to another embodiment. The first memory cells $Y_2$ to $Y_{n-1}$ are cascade connected, the rearmost unit $Y_{n-1}$ being connected to the foremost unit $Y_2$ through an inverter circuit I and a second memory cell $Y_1$. As seen from FIG. 2B, the inverter circuit I and second memory cell $Y_1$ have the same construction as those of FIG. 1B. The first memory cells $Y_2$ to $Y_{n-1}$ each include NAND means 8 supplied with an output from the preceding cell and a feedback signal and inverter means 9 supplied with an output from the NAND means 8.

Where the feedback signal represents the logic 1, then the NAND means 8 simply acts as inverter means like the second memory cell $Y_1$. However, where the feedback signal is changed to the logic 0, then the NAND means 8 has its output forcefully changed to the logic 1. This 1 output is inverted by the inverter means 9 which is operated upon receipt of a clock signal $\phi_2$ and its complement $\overline{\phi_2}$, so that the inverter means 9 has its output reset, that is, converter to the logic 0.

Figure 2B:
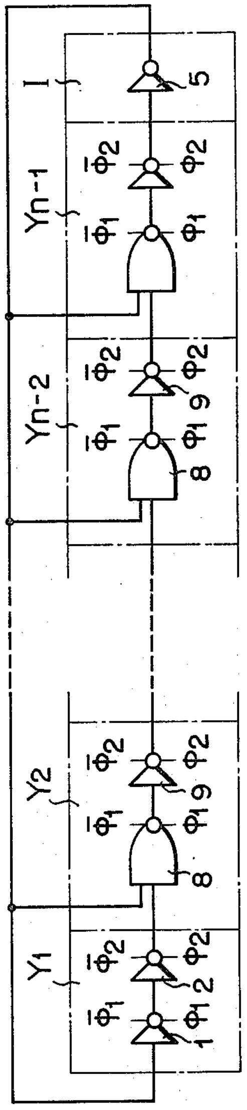
FIG. 2B is a logic diagram of the counter of FIG. 2A where there are used complementary insulated gate field effect transistor assembly.

The NOR means 4 of FIG. 1B may be formed of an OR circuit and NOT circuit, and the NAND means 8 of FIG. 2B may consist of an AND circuit and NOT circuit.

There will now be described by reference to FIG. 3 the concrete circuit arrangement of FIG. 1B. Referring to the second unit $X_2$ of the first memory cell assembly, the inverter means 3 is formed of a C-MOS FET assembly in which the conduction path between the source and drain of an N channel type FET 12 and that of a P channel type FET 13 are connected in series. The inverter means 3 is connected to a first power supply terminal ($-V$) through the conduction path of a MOS FET or first switching means 11 of the ame conductivity type as the aforesaid FET 12 and also to a second power supply terminal (ground) through the conduction path of another MOS FET or second switching means 14 of the same conductivity type as the aforesaid FET 13. The NOR means 4 includes an inverter means 21 consisting of an N type FET 17 and P type FET 18, third and fourth N type FET's 15 and 16 connecting the inverter means 21 to the first power supply terminal, a fifth P type FET 19 connecting the inverter means 21 to the second power supply terminal and a sixth P type FET 20 connected between the output terminal *d* and second power supply terminal. One terminal of the FET 20 connected to the second power supply terminal may be connected, as indicated in a dotted line, to the junction of the FET's 18 and 19. The gates or control electrodes of the FET's 20 and 16 are connected to the junction of the buffer B and inverter circuit I to receive the feedback signal. The first and second switching means 11 and 14 are enabled during a first time interval when the gates are supplied with clock pulses $\overline{\phi_1}$ and $\phi_1$ respectively, and the third and fourth switching means 15 and 19 are enabled during a second time interval when the gates are supplied with clock pulses $\overline{\phi_2}$ and $\phi_2$ respectively.

An output signal from the first memory cell $X_1$ supplied to the input terminal a (corresponding to the first input terminal $I_1$) of the inverter means 3 is produced at the output terminal b in an inverted form with a delay of a half-bit time in syncrhonization with the clock pulses $\phi_1$ and $\overline{\phi_1}$. The inverter means 21 consisting of the FET's 17 and 18 has its input terminal c connected to the output terminal *b* of the inverter means 3 so as to cause an input signal to be produced at the output terminal *d* (corresponding to the output terminal 0) in the form of an inverted output signal with a delay of a half-bit time in synchronization with clock pulses $\phi_2$ and $\overline{\phi_2}$. This corresponds to the case where the feedback signal represents the logic 0, or has a ground potential. Since, at this time, the FET 16 is turned on and the FET 20 is turned off, the NOR means 4 simply acts as an inverter means. However, when the feedback signal is changed to the logic 1, that is, −V volt potential, then conversely the FET 16 is turned off and the FET 20 is turned on and consequently an output signal from the output terminal d is reset to the logic 0, namely, the ground potential.

There will now be described by reference to FIG. 4 the operation of a counter having the circuit arrangement of FIG. 3. Now let it be assumed that the second memory cell $X_{n-1}$ is set by second clock pulses $\phi_2$ and $\overline{\phi_2}$, causing an output therefrom to have the same level of voltage as the power supply source (−V). The moment the second memory cell $X_{n-1}$ is set, the first memory cells $X_1$ to $X_{n-2}$ are reset by having the second input terminals supplied with the 1 signal. Accordingly, output signals from the first memory cells have the same level of voltage as the ground potential. Even when, under this condition, the first memory cells are supplied with first clock pulses $\phi_1$ and $\overline{\phi_1}$, output signals therefrom are not changed in condition. The foremost unit $X_1$ of the first memory cell assembly is supplied with an inverted or reset form of an output signal from the second memory cell $X_{n-1}$, and the succeeding memory cells $X_2$ to $X_{n-2}$ are supplied in turn with an output signal (in reset condition) from the immediately preceding cells. Upon receipt of second clock pulses $\phi_2$ and $\overline{\phi_2}$, the first memory cells produce output signals under the same condition as input signals supplied thereto. At this time, therefore, almost all the first memory cells are in a reset condition except for the foremost unit $X_1$ which is supplied with an input signal constituted by an inverted form of an output signal from the second memory cell $X_{n-1}$ and converted to a set condition. Upon receipt of the first clock pulses $\phi_1$ and $\overline{\phi_1}$, the first memory cells are supplied with reset input signals and, upon receipt of the second clock pulses $\phi_2$ and $\overline{\phi_2}$, deliver them intact. Under this condition, only the foremost unit $X_1$ of the first memory cell assembly is in a set condition, whereas all the remaining units are still in a reset condition. A set output signal from the foremost unit $X_1$ is transferred to the succeeding units in turn by the first clock pulses $\phi_1$ and $\overline{\phi_1}$ and delivered there-from by the second clock pulses $\phi_2$ and $\overline{\phi_2}$. Accordingly, each time there are supplied paired clock pulses of $\phi_1 - \phi_2$ and $\overline{\phi_1} - \overline{\phi_2}$, the remaining first memory cells $X_2$ to $X_{n-2}$ are successively converted to a set condition. Therefore, once set, the foremost unit $X_1$ remains intact until all the other units $X_2$ to $X_{n-2}$ are converted to a set condition. Conversely where the second memory cell $X_{n-1}$ is set, the first memory cells $X_1$ to $X_{n-2}$ which were set up to this point are all converted to a reset condition. The above-mentioned operation is repeated hereinafter. Thus there have to be used *n* pairs of clock pulses $\phi_1$ and $\phi_2$ until the second memory cell $X_{n-1}$ which was previously set for a one-bit time interval is similarly set a second time. Obviously, therefore, the circuit of FIG. 3 acts as an *n*-scale counter.

There will now be described by reference to FIG. 5 the concrete circuit arrangement of a counter shown in FIG. 2B. The construction of memory cells will be described with the foremost unit $Y_2$ of the first memory cell assembly taken as an example. The NAND means 8 includes an inverter means 25 consisting of MOS FET's 26 and 27. The inverter means 25 is connected at one end to a first power supply terminal (−V) by a first switching means 28 of the same conductivity type as an FET 26 and at the other end to a second power supply terminal (ground) by second and third switching means 29 and 30 of the same conductivity type as an FET 27. Between the output terminal of the inverter means 25 and the first power supply terminal is connected a fourth switching means 31 of the same conductivity type as the FET 26. While, in FIG. 5, one end of the fourth switching means 31 is connected to the first power supply terminal through the FET 28, it is possible to connect the fourth switching means 31 directly to the first power supply terminal as indicated in dotted lines. The switching means 30 and 31 have their gates or control electrodes connected to the junction of the inverter circuit I and the second memory cell $Y_1$ so as to receive a feedback signal.

The inverter means 25 has its output terminal connected to the input terminal of the inverter means 9. This latter inverter means 9 is formed of FET's 32 and 33 and connected at one end to the first power supply terminal through a fifth switching means 34 of the same conductivity type as the FET 32 and at the other end to a second power supply terminal by a sixth switching means 35 of the same conductivity type as the FET 33. The first and second switching means 28 and 29 are enabled when the gates are supplied with the first clock pulses $\overline{\phi_1}$ and $\phi_1$. The fifth and sixth switching means 34 and 35 are enabled when the gates are impressed with the second clock pulses $\overline{\phi_2}$ and $\phi_2$.

When an output from the inverter circuit I represents the logic 1, namely, has the voltage level (−V) of the power supply source, then the FET 31 is turned off and the FET 30 is turned on. Since, under this condition, the NAND means 8 simply acts as an inverter means, the first memory cells $Y_2$ to $Y_2$ to $Y_{n-1}$ have the same function as the second memory cell $Y_1$. When an output from the inverter circuit I is converted to the logic 0, that is, a ground potential, then conversely the FET 31 is turned on and the FET 30 is turned off. Accordingly, an output from the NAND means 8 is converted to the logic 1 or the voltage level (−V) of the power supply source in synchronization with the first clock pulses $\bar{\phi}_1$ and $\phi_1$, and later is inverted by the inverter means 9 in synchronization with the second clock pulses $\bar{\phi}_2$ and $\phi_2$, causing an output of the foremost unit $Y_2$ of the first memory cell assembly to be reset to a ground potential.

Figure 3:
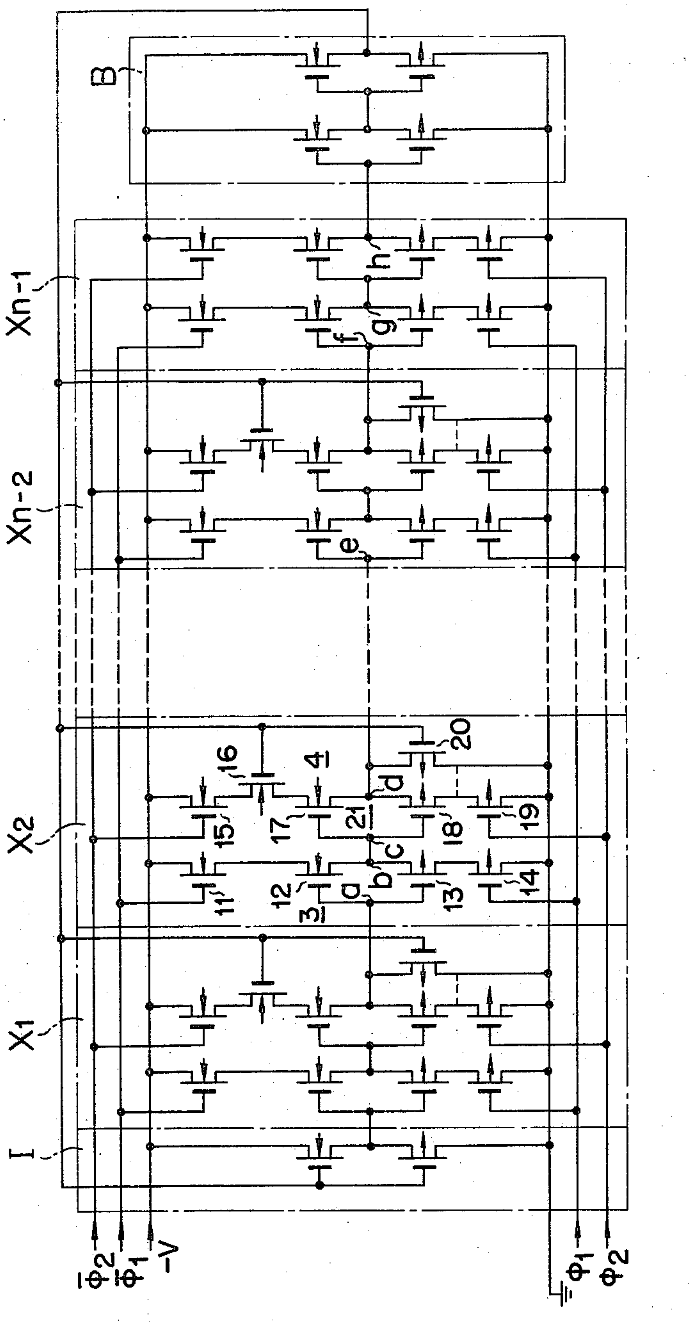
FIG. 3 is a circuit diagram of the counter of FIG. 1B.
Figure 4:
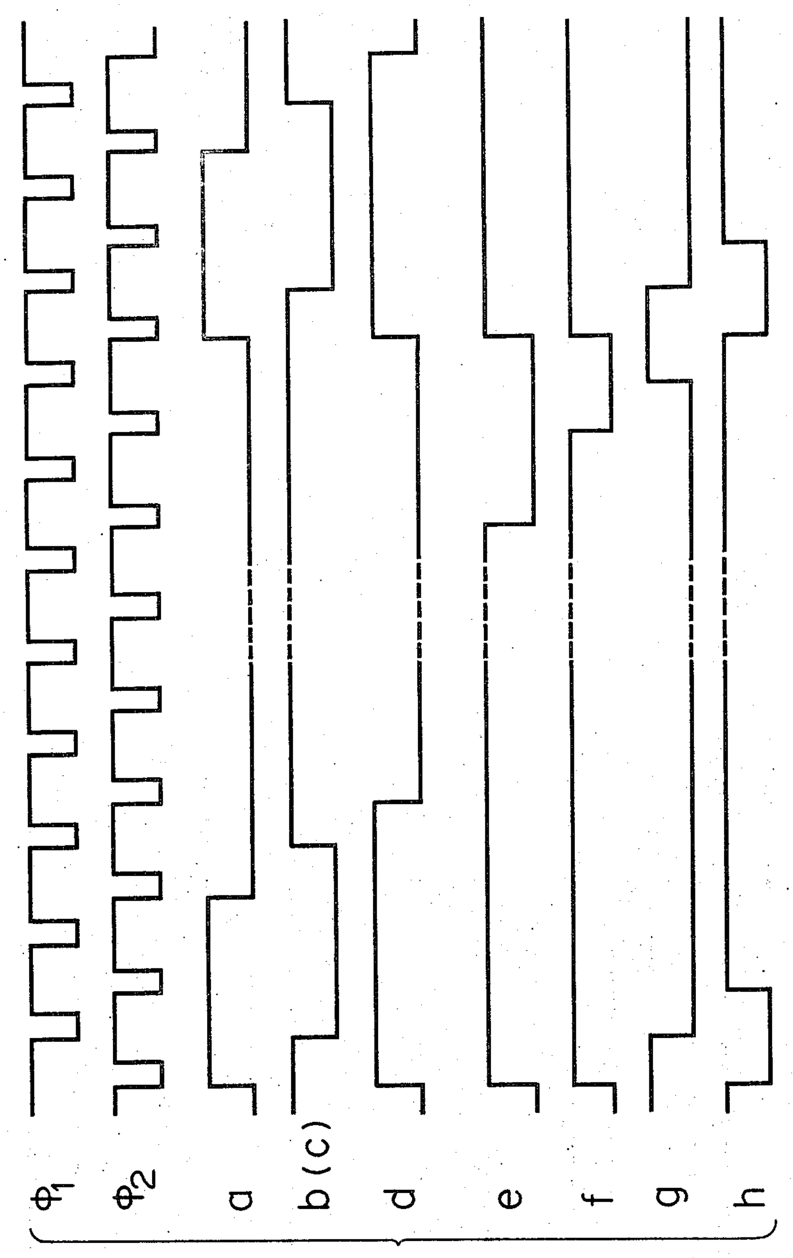
FIG. 4 represents wave forms at various points of the counter of FIG. 3 to illustrate the operation thereof.
Figure 5:
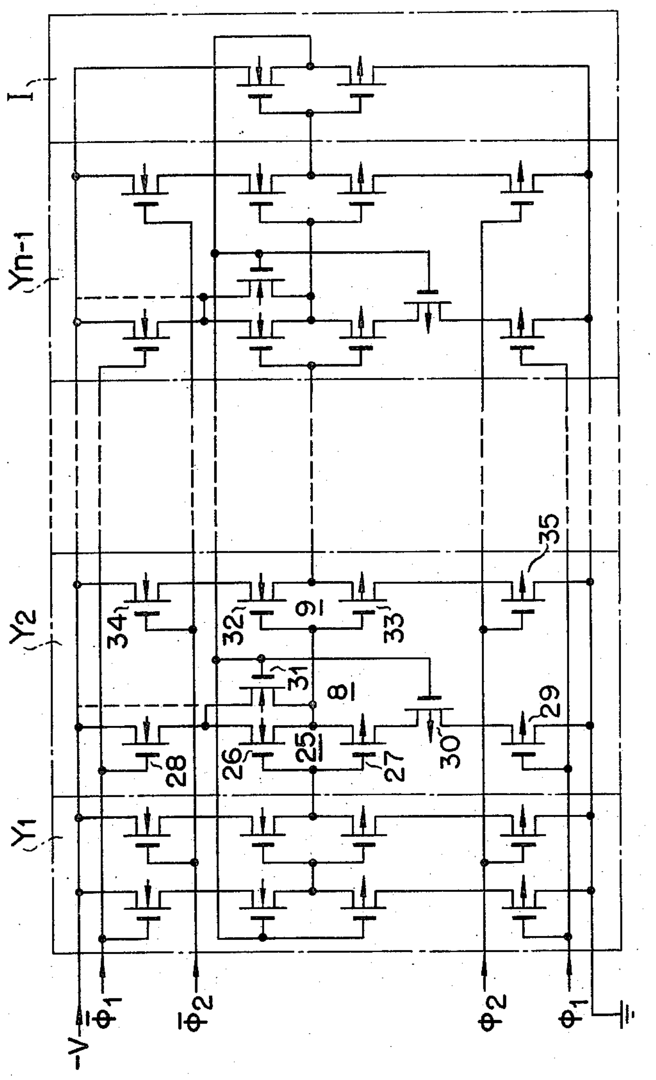
FIG. 5 is a circuit diagram of the counter of FIG. 2B.

A counter having the circuit arrangement of FIG. 5 is operated substantially in the same manner as that of FIG. 3. When the rearmost unit $Y_{n-1}$ of the first memory cells produces a set output upon receipt of the second clock pulses $\phi_2$ and $\bar{\phi}_2$, then the succeeding second clock pulses $\phi_2$ and $\bar{\phi}_2$ reset outputs from all the first and second memory cells $Y_1$ to $Y_{n-1}$. A third arrival of the second clock pulses $\phi_2$ and $\bar{\phi}_2$ only sets an output from the second memory cell $Y_1$. Thereafter the successive arrivals of the second clock pulses $\phi_2$ and $\bar{\phi}_2$ set the first memory cells $Y_2$ to $Y_{n-1}$ in turn. Therefore, there are required n pairs of first and second clock pulses of $\phi_1 - \bar{\phi}_1$ and $\phi_2 - \bar{\phi}_2$ until the previously set rearmost unit $Y_{n-1}$ of the first memory cell assembly is set a second time.

Figure 6:
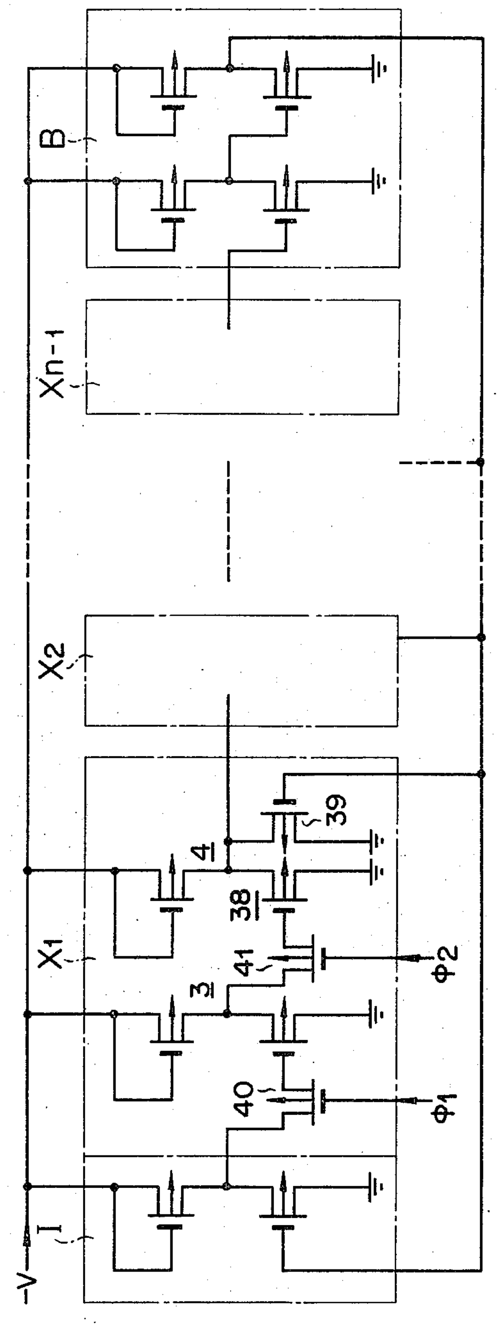
FIG. 6 is a circuit diagram of the counter of FIG. 1A where it is only formed of P channel type insulated gate field effect transistors.
Figure 7:
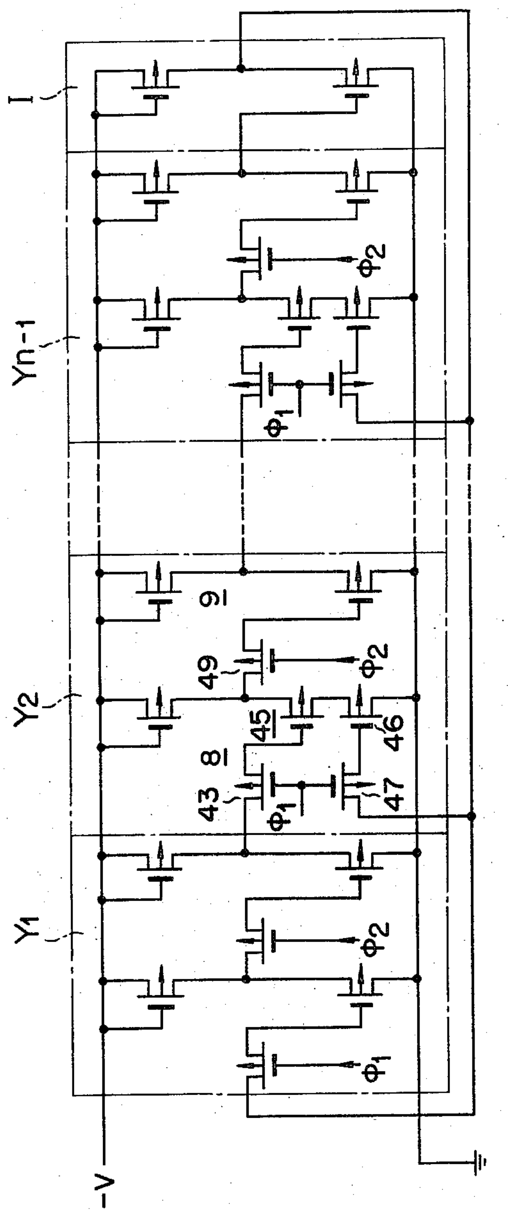
FIG. 7 is a circuit diagram of the counter of FIG. 2A where it is only formed of P channel type insulated gate field effect transistors.

The circuit arrangements of FIGS. 6 and 7 represent counters modified from those of FIGS. 3 and 5 by constructing them of MOS FET's of the same conductivity type, for example, the P type. Referring to FIG. 6, the foremost memory cell $X_1$ includes the inverter means 3 and NOR means 4 as in FIGS. 1B and 3. The inverter means 3 is connected between the first and second power supply terminals. The NOR means 4 includes an inverter means 38 connected between the first and second power supply terminals; and a first switching means 39 connected between the output terminal of the inverter means 38 and the second power supply terminal (ground potential), the gate of the first switching means 39 being connected to the junction of the rearmost memory cell $X_{n-1}$ and inverter circuit I so as to be supplied with a feedback signal. Between the inverter means 3 and the output terminal of the preceding memory cell or inverter circuit is connected a second switching means 40, the gate of which is supplied with a first clock pulse $\phi_1$. Between the output terminal of the inverter means 3 and the input terminal of another inverter means 38 is connected a third switching means 41, the gate of which is supplied with a second clock pulse $\phi_2$. In the case of FIG. 6, there are not required the complementary clock pulses $\bar{\phi}_1$ and $\bar{\phi}_2$ of the main clock pulses $\phi_1$ and $\phi_2$. The rearmost memory cell $X_{n-1}$ does not include a first switching means like the first switching means 39 of the foremost stage memory cell $X_1$. The inverter means 3 inverts an input signal in synchronization with the first clock pulse $\phi_1$, and another inverter means 38 inverts an output from the former inverter means 3 in synchronization with the second clock pulse $\phi_2$. When the feedback signal is changed from the logic 0 to 1, an output from the NOR means 4 is reset. The counter of FIG. 6 is operated in the same manner as that of FIG. 3 and description thereof is omitted.

Referring to FIG. 7, the foremost unit $Y_2$ of the first memory cell assembly includes the NAND means 8 and inverter means 9 like those of FIGS. 2B and 5. The NAND means 8 includes an inverter means 45 which is connected at one end to the first power supply terminal (−V) and at the other end to the second power supply terminal (ground potential) through a first switching means 46. The first switching means 46 has its gate connected to the junction of the second memory cell $Y_1$ and inverter circuit I through a second switching means 47 so as to be supplied with a feedback signal. Between the input terminal of the inverter means 8 and the output terminal of the preceding memory cell is connected a third switching means 43. The second and third switching means 47 and 43 are enabled when the gates are supplied with the first clock pulse $\phi_1$. Between the first and second power supply terminals is connected the inverter means 9, the input terminal of which is connected to the output terminal of another inverter means 45 through a fourth switching means 49, which is enabled when the gate is supplied with the second clock pulse $\phi_2$.

Where the inverter circuit I produces an output signal of the logic 1, the output is supplied to the first switching means 46 for its actuation through the second switching means 47 which is rendered conducting upon receipt of the first clock pulse $\phi_1$. Since, at this time, the NAND means 8 simply acts as an inverter means, the first memory cells $Y_2$ to $Y_{n-1}$ are operated in the same manner as the second memory cell $Y_1$. Namely, an output from the second memory cell $Y_1$ is inverted by the inverter means 45 in synchronization with the first clock pulse $\phi_1$. The inverter output is further inverted by the inverter means 9 in synchronization with the second clock pulse $\phi_2$. When an output from the inverter circuit I is converted to the logic 0, namely, a ground potential, then an output from the NAND means 8 or the inverter means 45 is changed to the logic 1, because the first switching means 46 remains nonconducting. The 1 output is again inverted by the inverter means 9 in synchronization with the second clock pulse $\phi_2$, causing outputs from the first memory cells $Y_2$ to $Y_{n-1}$ to be reset. The counter of FIG. 7 is operated in the same manner as that of FIG. 5 and description thereof is omitted.

Figure 8A:
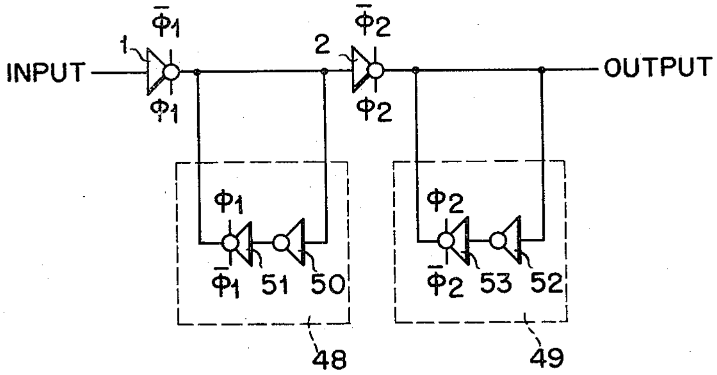
FIGS. 8A and 8B are logic diagrams for converting the one-bit dynamic shift registers of FIGS. 1B and 2B to static shift registers.
Figure 8B:
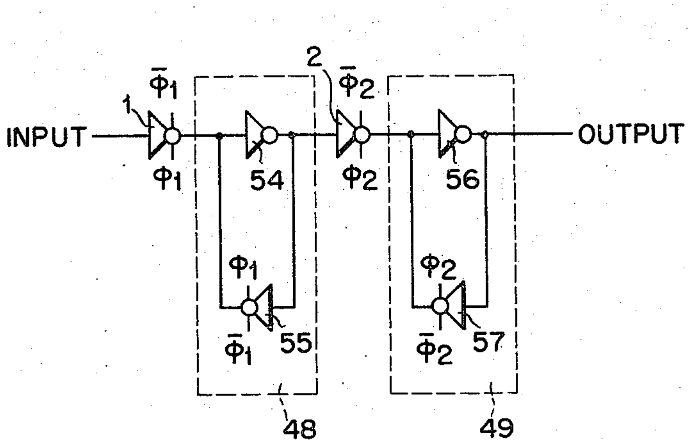
Figure 9A:
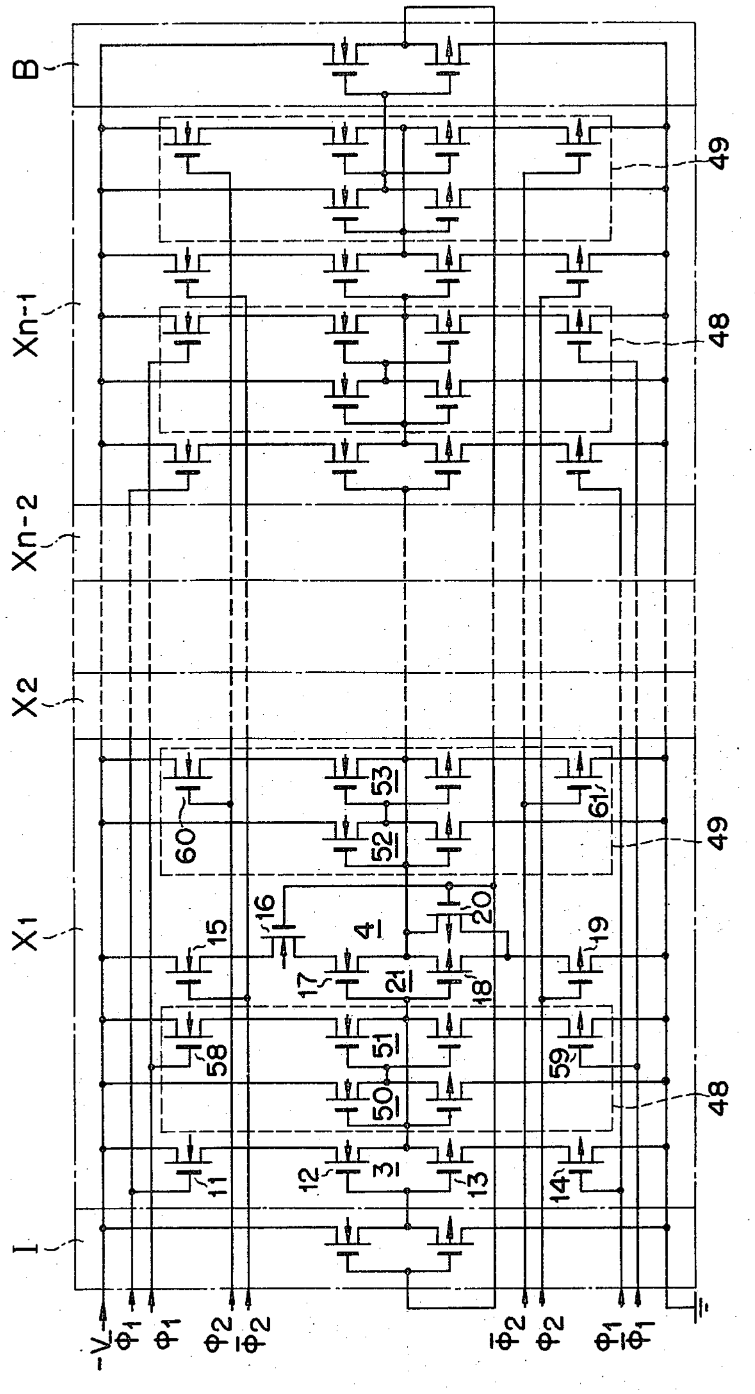
FIG. 9A is a circuit diagram of an $n$-scale static counter formed by applying the one-bit static shift register of FIG. 8A to the dynamic counter of FIG. 3.
Figure 9B:
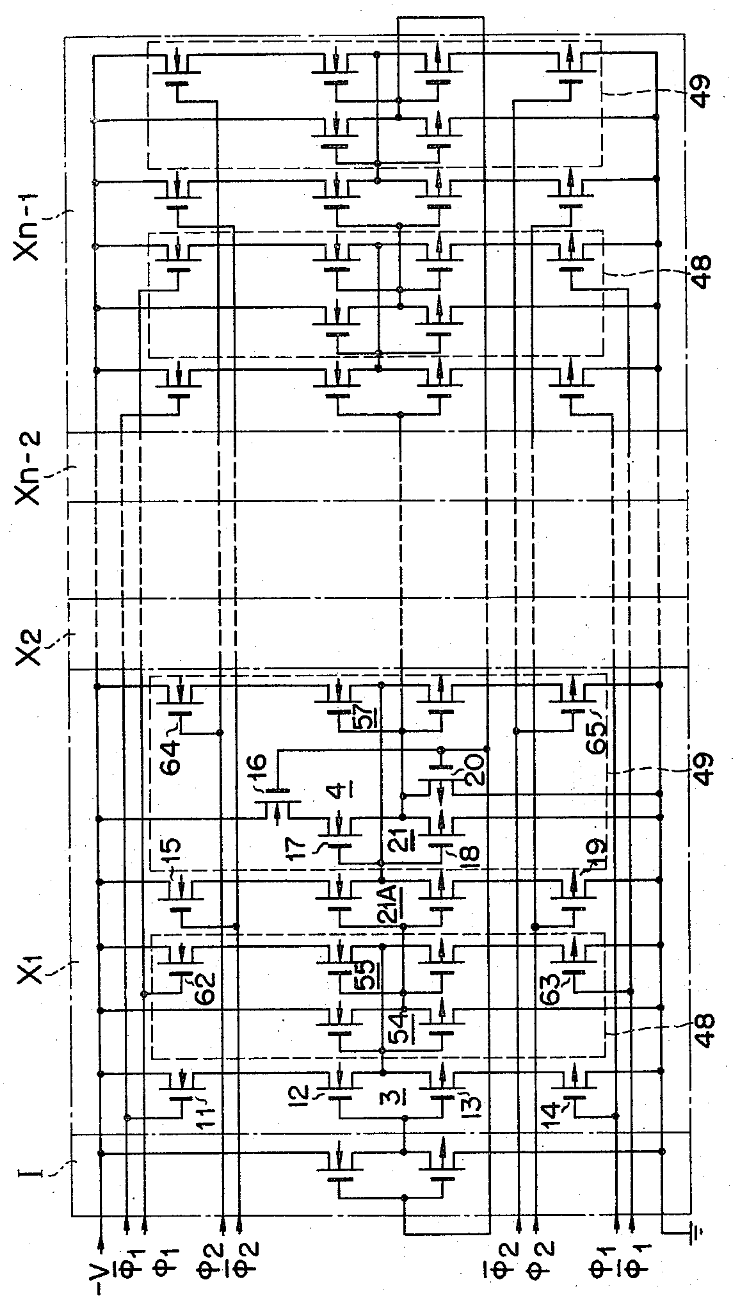
FIG. 9B is a circuit diagram of an $n$-scale static counter formed by applying th one-bit static shift register of FIG. 8B to the dynamic counter of FIG. 3.
Figure 10A:
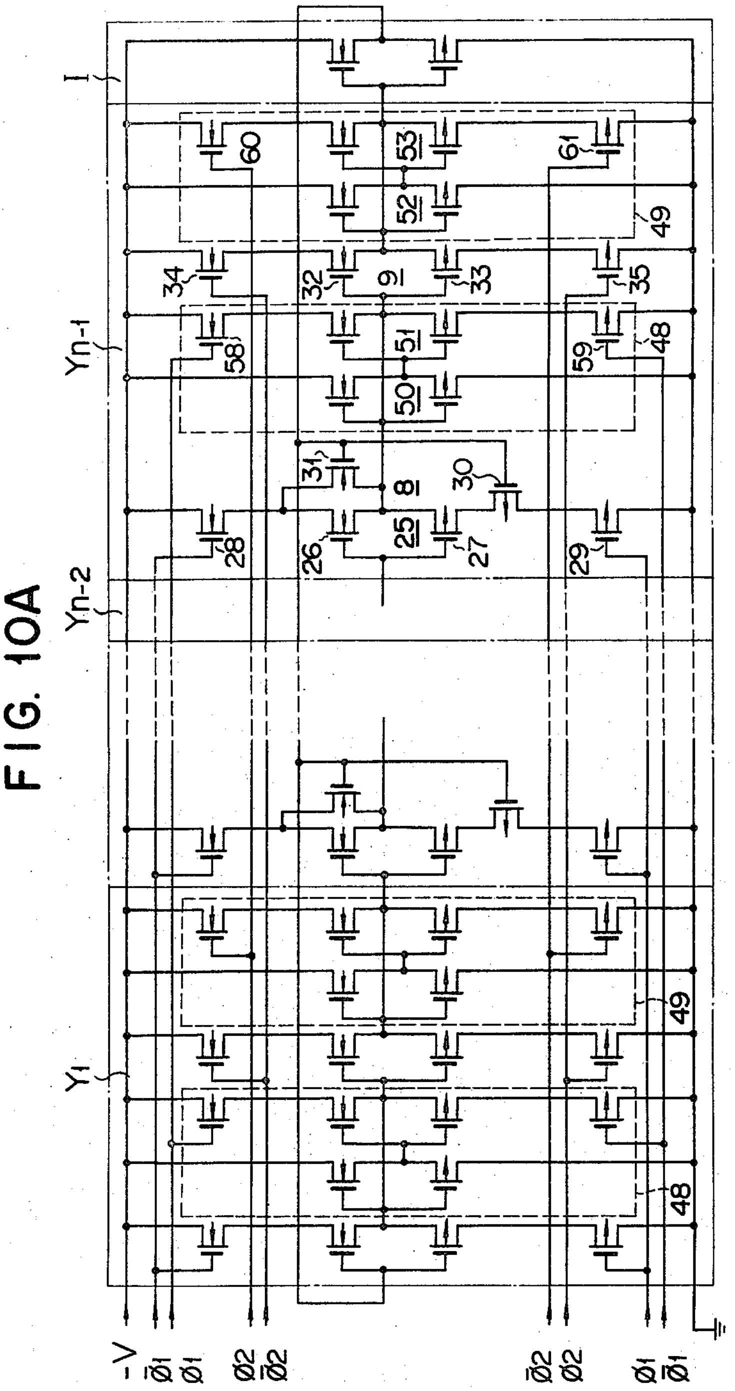
FIG. 10A is a circuit diagram of an *n*-scale static counter formed by applying the one-bit static shift register of FIG. 8A to the dynamic counter of FIG. 5.
Figure 10B:
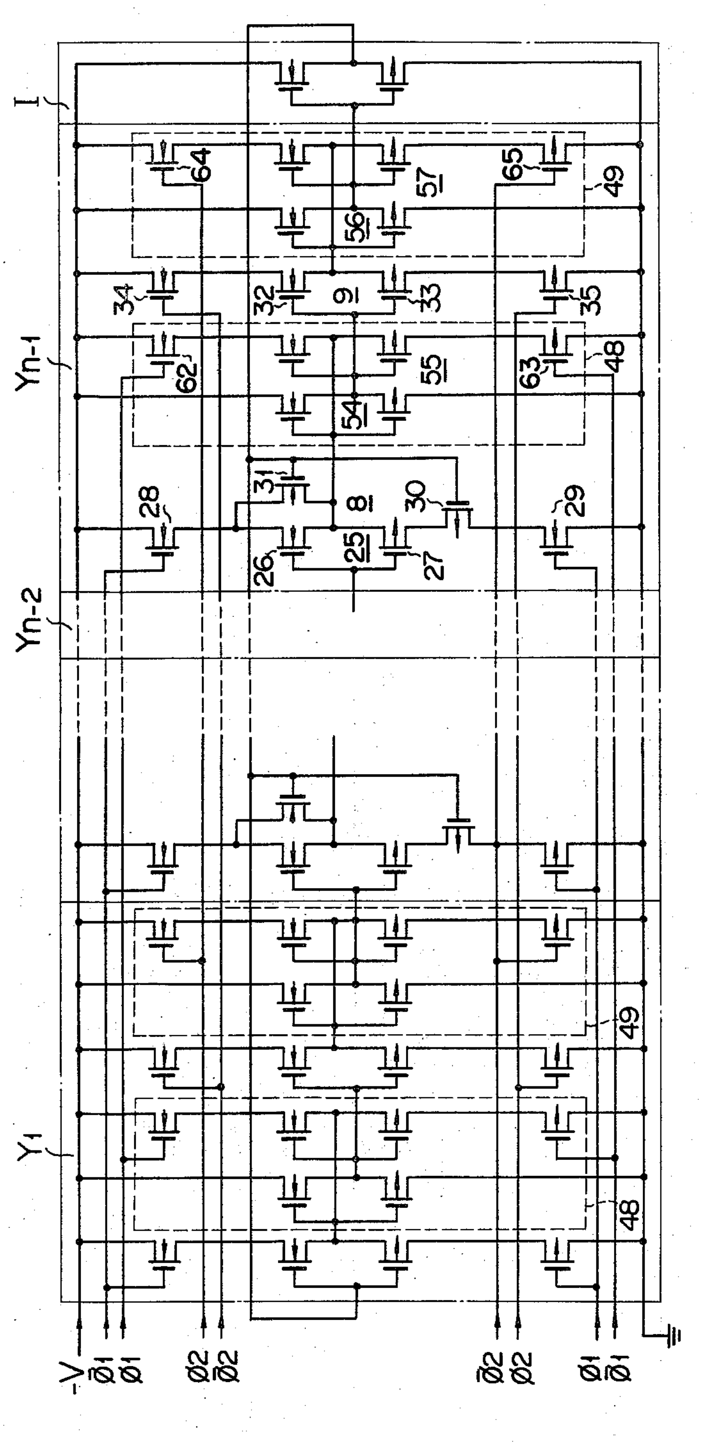
FIG. 10B is a circuit diagram of an *n*-scale static counter formed by applying the one-bit static shift register of FIG. 8B to the dynamic counter of FIG. 5.
Figure 11A:
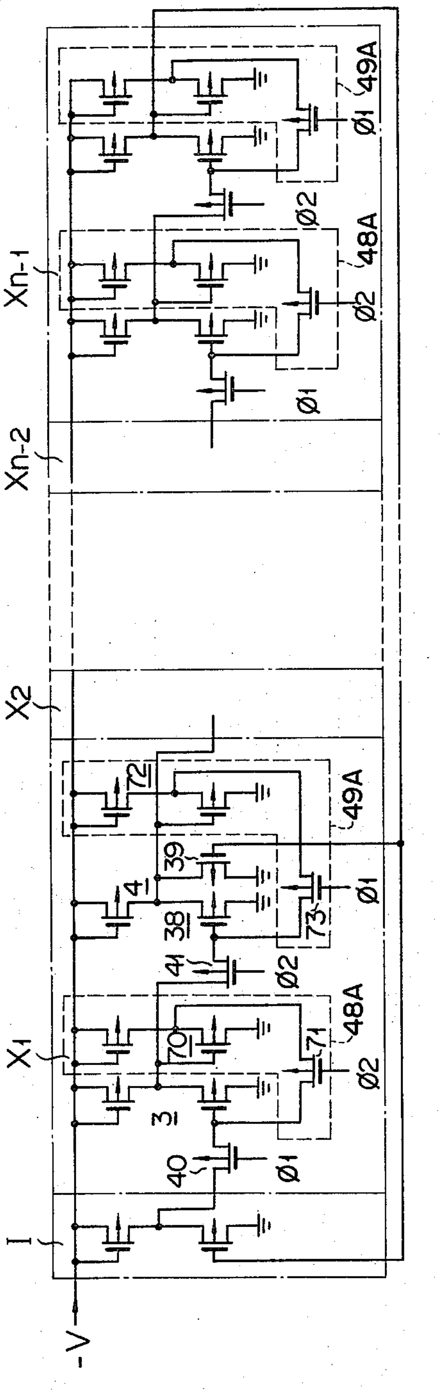
FIG. 11A is a circuit diagram of a static counter converted from the dynamic counter of FIG. 6 according to an embodiment of the invention.
Figure 11B:
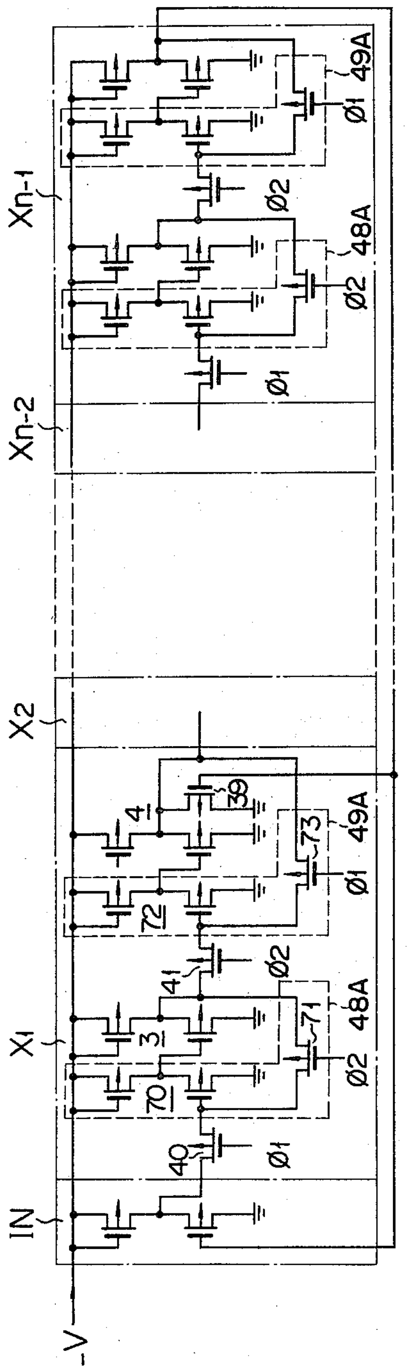
FIG. 11B is a modification of FIG. 11A.
Figure 12A:
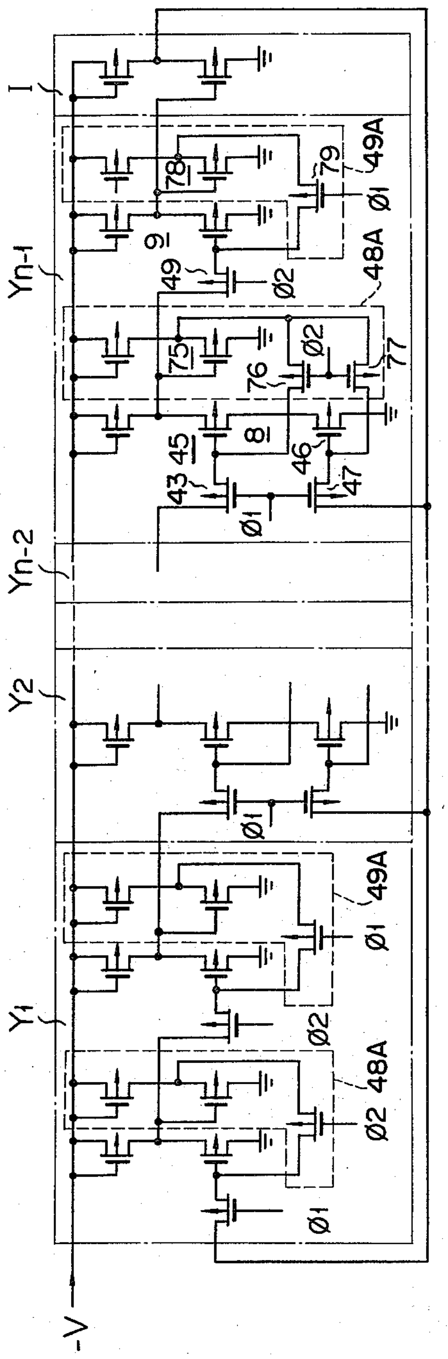
FIG. 12A is a circuit diagram of a static counter converted from the dynamic counter of FIG. 7 according to another embodiment of the invention.
Figure 12B:
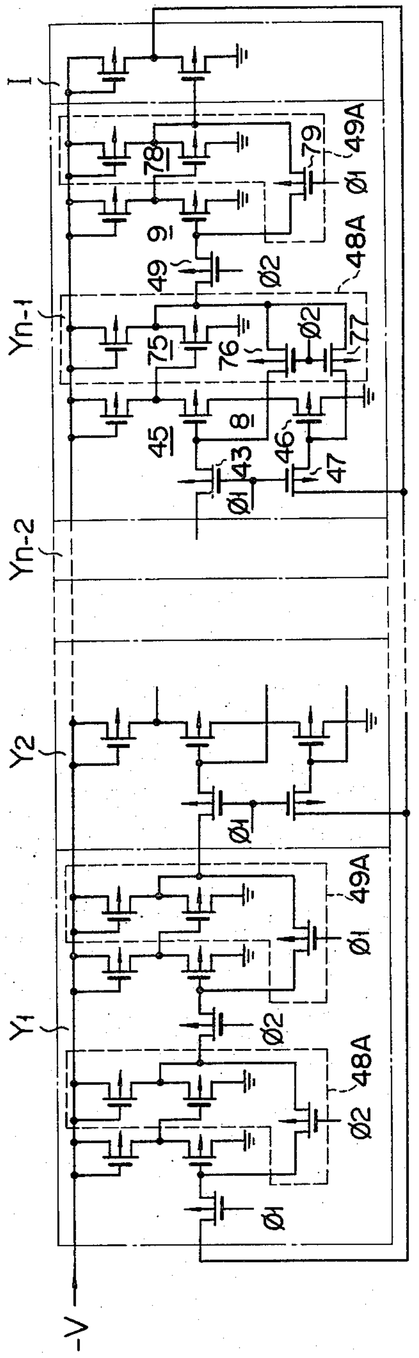
FIG. 12B is a modification of FIG. 12A.

The aforementioned counters are all of a dynamic type. There will now be described a static counter. FIGS. 8A and 8B are the logic diagrams of operation stabilizing circuits 48 and 49 which are added to a dynamic counter to convert it to a static type. FIGS. 8A and 8B represent the arrangement of a one-bit shift register, particularly that of the second memory cells $X_{n-1}$ and $Y_1$. Throughout these figures, numeral 1 denotes the inverter means of the second memory cells $X_{n-1}$ and $Y_1$ for inverting an input in synchronization with the first clock pulse $\phi_1$ and its complement $\bar{\phi}_1$, and numeral 2 represents the inverter means of the second memory cells $X_{n-1}$ and $Y_1$ for inverting an input in synchronization with the second clock pulse $\phi_2$ and its complement $\bar{\phi}_2$. The operation stabilizing circuits defined within dotted lines are used to hold outputs from the inverter means 1 and 2 for a one-bit time interval.

Referring to FIG. 8A, the output terminal of a first inverter means 1 is connected to the input terminal of only during a second time interval after said first time interval.

19. The counter according to claim 18 wherein said NAND means, inverter means and switching means include field effect transistors of the same conductivity type.

20. The counter according to claim 19 wherein the conductivity type of the field effect transistors is P type.

21. The counter according to claim 7 further including a third inverter means disposed between said first and second power supply terminals and having an output terminal and an input terminal connected to the output terminal of said first mentioned inverter means;

a fourth inverter means having an output terminal and an input terminal connected to the output terminal of said third switching means, the output terminal of said fourth inverter means being connected to the output terminal of said first mentioned inverter means;

seventh and eighth switching means for connecting said fourth inverter means to said first and second power supply terminals;

a fifth inverter means disposed between said first and second power supply terminals and having an output terminal and an input terminal connected to the output terminal of said second inverter means included in said NOR means;

ninth and tenth switching means for connecting said fifth inverter means to said first aand second power supply terminals; and clock pulse supplying means for enabling said seventh and eighth switching means only until said first and second switching means which were previously enabled are again brought into operation and enabling said ninth and tenth switching means only until said third and fourth switching means which were previously enabled are again brought into operation.

22. The counter according to claim 6 further including first and second power supply terminals across which an operating potential may be applied;

first and second switching means for connecting said inverter means to said first and second power supply terminals;

a second inverter means disposed between said first and second power supply terminals and having an output terminal and an input terminal connected to the output terminal of said first mentioned inverter means;

a third inverter means having an output terminal and an input terminal connected to the output terminal of said second inverter means;

third and fourth switching means for connecting said third inverter means between said first and second power supply terminals;

wherein said NOR means includes a fourth inverter means having an output terminal and an input terminal connected to the output terminal of said third inverter means, a fifth switching means for connecting said fourth inverter means to said first power supply terminal, and a sixth switching means for connecting the output terminal of said fourth inverter means to said second power supply terminal, said sixth switching means having a control electrode connected to the junction of said second memory cell and said inverter circuit;

a fifth inverter means having an output terminal and an input terminal connected to the output terminal of said second inverter means, the output terminal of said fifth inverter means being connected to the output terminal of said first mentioned inverter means;

seventh and eighth switching means for connecting said fifth inverter means to said first and second power supply terminals;

a sixth inverter means having an output terminal and an input terminal connected to the output terminal of said fourth inverter means, the output terminal of said sixth inverter means being connected to the output terminal of said third inverter means;

ninth and tenth switching means for connecting said sixth inverter means to said first and second power supply terminals; and clock pulse supplying means for enabling said first and second switching means only during a first time interval and enabling said third and fourth switching means only during a second time interval after said first time interval, and enabling said seventh and eighth switching means only until said first and second switching means which were previously actuated are again brought into operation and enabling said ninth and tenth switching means only until said third and fourth switching means which were previously operated are again enabled.

23. The counter according to claim 13 further including a third inverter means disposed between said first and second power supply terminals and having an output terminal and an input terminal connected to the output terminal of said second inverter means;

a fourth inverter means having an output terminal and an input terminal connected to the output terminal of said third inverter means, the output terminal of said fourth inverter means being connected to the output terminal of said second inverter means;

seventh and eighth switching means for connecting said fourth inverter means to said first and second power supply terminals;

a fifth inverter means disposed between said first and second power supply terminals and having an output terminal and an input terminal connected to the output terminal of said first mentioned inverter means;

a sixth inverter means having an output terminal and an input terminal connected to the output terminal of said fifth inverter means;

ninth and tenth switching means for connecting said sixth inverter means to said first and second power supply terminals; and clock pulse supplying means for enabling said seventh and eighth switching means only until said first and second switching means which were previously enabled are again brought into operation, and enabling said ninth and tenth switching means only until said third and fourth switching means which were previously enabled are again enabled.

24. The counter according to claim 13 further including a third inverter means disposed between the first and second power supply terminals and having an input terminal connected to the output terminal of said second inverter means included in said NAND means and an output terminal connected to the input terminal of said first mentioned inverter means;

a fourth inverter means having an input terminal connected to the output terminal of said third inverter means and an output terminal connected to the output terminal of said second inverter means;

seventh and eighth switching means for connecting said fourth inverter means to said first and second power supply terminals;

a fifth inverter means disposed between said first and second power supply terminals and having an output terminal and an input terminal connected to the output terminal of said first mentioned inverter means;

a sixth inverter means having an input terminal connected to the output terminal of said fifth inverter means and output terminal connected to the output terminal of said first mentioned inverter means;

ninth and tenth switching means for connecting said sixth inverter means to said first and second power supply terminals; and clock pulse supplying means for enabling said seventh and eighth switching means only until said first and second switching means which were previously enabled are again put into operation and enabling said ninth and tenth switching means only until said third and fourth switching means which were previously enabled are again brought into operation.

25. The counter according to claim 15 further including a third inverter means disposed between said first and second power supply terminals and having an output terminal and an input terminal connected to the output terminal of said first mentioned inverter means;

a fourth switching means for connecting the output terminal of said third inverter means to the input terminal of said first mentioned inverter means, said fourth switching means being enabled in synchronization with said third switching means;

a fourth inverter means disposed between said first and second power supply terminals and having an output terminal and an input terminal connected to the output terminal of said second inverter means included in said NOR means; and a fifth switching means for connecting the output terminal of said fourth inverter means to the input terminal of said second inverter means, said fifth switching means being enabled in synchronization with said second switching means.

26. The counter according to claim 15 further including a third inverter means disposed between said first and second power supply terminals and connected betweeen said first mentioned inverter means and said second switching means, said third inverter means having an input terminal connected to said second switching means and an output terminal connected to the input terminal of said first mentioned inverter means;

a fourth switching means for connecting the output terminal of said first mentioned inverter means to the input terminal of said third inverter means, said fourth switching means being enabled in synchronization with said third switching means;

a fourth inverter means connected between said third switching means and said second inverter means included in said NOR means and having an input terminal connected to said third switching means and an output terminal connected to the input terminal of said second inverter means; and a fifth switching means for connecting the output terminal of said second inverter means to the input terminal of said fourth inverter means, said fifth switching means being enabled in synchronization with said second switching means.

27. The counter according to claim 18 further including a third inverter means disposed between said first and second power supply terminals and having an output terminal and an input terminal connected to the output terminal of said second inverter means;

fifth and sixth switching means for connecting the output terminal of said third inverter means to the input terminal of said second inverter means and the control electrode of said first switching means, said fifth and sixth switching means being enabled in synchronization with said fourth switching means;

a fourth inverter means disposed between said first and second power supply terminals and having an output terminal and an input terminal connected to the output terminal of said first mentioned inverter means; and a seventh switching means for connecting the output terminal of said fourth inverter means to the input terminal of said first mentioned inverter means, said seventh switching means being enabled in synchronization with said second and third switching means.

28. The counter according to claim 18 further including a third inverter means disposed between said first and second power supply terminals and provided with an input terminal connected to the output terminal of said second inverter means and an output terminal connected to said fourth switching means;

fifth and sixth switching means for connecting the output terminal of said third inverter means to the input terminal of said second inverter means and the control electrode of said first switching means, said fifth and sixth switching means being enabled in synchronization with said fourth switching means;

a fourth inverter means disposed between said first and second power supply terminals and having an output and an input terminal connected to the output terminal of said first mentioned inverter means; and a seventh switching means for connecting the output terminal of said fourth inverter means to the input terminal of said first mentioned inverter means, said seventh switching means being enabled in synchronization with said second and third switching means.

* * * * * terminal 0, and the gate of the FET 105 is connected to the second input terminal $I_2$. A signal supplied to the input terminal $I_2$ normally takes the logic form of 0, so that the FET 105 is kept conducting. When the FET 102 is enabled by the first clock pulse $\phi_1$, then the FET 103 is supplied with a signal representing the logic 0. Even though the FET 101 is rendered conducting by the second clock pulse $\phi_2$, if the input terminal $I_1$ is supplied with a signal of 1, then the FET 100 remains inoperative and an input signal to the FET 103 is not changed in the logic form. When the input terminal $I_1$ is supplied with a signal of 0, then the FET 100 is enabled and the FET 103 is supplied with a signal of 1. Thus an input signal to the FET 100 is inverted in synchronization with the clock pulses $\phi_1$ and $\overline{\phi_2}$. Then the signal supplied to the FET 103 is further inverted in synchronization with the clock pulses $\phi_3$ and $\overline{\phi_4}$ to be produced at the output terminal 0. When an output from the second memory cell $X_{n-1}$ is set in synchronization with the clock pulse $\overline{\phi_4}$, the input terminal $I_2$ is supplied with a signal of 1 and the FET 105 is rendered nonconducting, causing all the first memory cells $X_1$ to $X_{n-2}$ to be reset. A counter having the circuit arrangement of FIG. 15 is operated in exactly the same manner as that of FIG. 3. While the counters of FIGS. 13 and 15 use 4-phase clock pulses, they require a smaller number of FET's for the memory cells.

What we claim is:

1. An *n*-scale counter comprising:

first memory cells each having first and second input terminals and one output terminal and cascade connected in a number of *n*-2, the output terminal of the first memory cell being connected to the first input terminal of the next subsequent one, the first memory cell taking out as an output signal at the output terminal an input signal to the first input terminal with a delay of a predetermined length of time, when the second input terminal is at a first voltage level, and resetting an output signal at the output terminal, when the second input terminal is at a second voltage level;

a second memory cell having one input terminal and one output terminal and interposed between the foremost and rearmost units of said first cascade connected memory cells, said second memory cell taking out as an output signal at the output terminal an input signal to the input terminal with a delay of a predetermined length of time;

an inverter circuit connected in series to said second memory cell between the foremost and rearmost units of said first cascade connected memory cells; and means for connecting the junction of said inverter circuit and said second memory cell to the second input terminals of said first memory cells.

2. The counter according to claim 1 further comprising a buffer means connected between the rearmost unit of said first cascade connected memory cells and the junction of said inverter circuit and said second memory cell.

3. The counter according to claim 2 wherein said buffer means includes at least two cascade connected inverter means.

4. The counter according to claim 1z wherein said second memory cell is connected to the rearmost unit of said first memory cells and coupled to the foremost unit of said first memory cells through said inverter circuit.

5. The counter according to claim 1 wherein said inverter circuit is connected to the rearmost unit of said first memory cells and coupled to the foremost unit of said first memory cells through said second memory cell.

6. The counter according to claim 1 wherein said first memory cells each include an inverter means having an input and an output terminal and a NOR means having two input terminals and one output terminal, one of said input terminals being connected to the output terminal of said inverter means and the other being connected to the junction of said second memory cell and said inverter circuit.

7. The counter according to claim 6 further including:

first and second power supply terminals across which an operating potential may be applied; and first and second switching means for connecting said inverter means between said first and second power supply terminals;

wherein said NOR means includes a second inverter means having an input terminal and an output terminal, said input terminal being connected to the output terminal of said first mentioned inverter means, third and fourth switching means for connecting said second inverter means between said first and second power supply terminals, a fifth switching means disposed between said third switching means and said second inverter means and having a control electrode, a sixth switching means disposed between the output terminal of said second inverter means and said second power supply terminal and having a control electrode, the control electrodes of said fifth and sixth switching means being jointly connected to the junction of said second memory cells and said inverter circuit; and clock pulse supplying means for enabling said first and second switching means only during a first time interval and enabling said third and fourth switching means only during a second time interval after said first time interval.

8. The counter according to claim 7 wherein said first mentioned inverter means includes complementary field effect transistor assembly;

wherein said first and second switching means consist of field effect transistors of opposite conductivity types and are connected to those of the field effect transistors included in said inverter means which are of the same conductivity type;

wherein said second inverter means of said NOR means includes complementary symmetry field effect transistors;

wherein said fourth and fifth switching means are field effect transistors of opposite conductivity types and are connected to those of the field effect transistors included in said second inverter means which are of the same conductivity type; and wherein said third and sixth switching means are field effect transistors of the same conductivity type as those of said fifth and fourth switching means respectively.

9. The counter according to claim 1 wherein said second memory cell includes at least first and second inverter means.

10. The counter according to claim 9 further including first and second power supply terminals across which an operating potential may be applied;

wherein said first and second inverter means are each provided with an input terminal and an output terminal, the input terminal of said second inverter means being connected to the output terminal of said first inverter means;

first and second switching means for connecting said first inverter means to said first and second power supply terminals; and third and fourth switching means for connecting said second inverter means to said first and second power supply terminals; and clock pulse supplying means for enabling said first and second switching means only during a first time interval and enabling said third and fourth switching means only during a second time interval after said first time interval.

11. The counter according to claim 10 wherein said first and second inverter means include complementary field effect transistor assembly; and wherein said first to fourth switching means are field effect transistors connected to those of the field effect transistors included in said first and second inverter means which are of the same conductivity type.

12. The counter according to claim 1 wherein said first memory cells each include a NAND means having two input terminals and one output terminal, one of said input terminals being connected to the junction of said second memory cell and said inverter circuit; and an inverter means having an output terminal and an input terminal connected to the output terminal of said NAND means.

13. The counter according to claim 12 further including first and second power supply terminals across which an operating potential may be applied;

wherein said NAND means includes a second inverter means having an input terminal and an output terminal, first and second switching means for connecting said second inverter means to said first and second power supply terminals, a third switching means disposed between said second inverter means and said second switching means and having a control electrode, a fourth switching means disposed between the output terminal of said second inverter means and said first power supply terminal and having a control electrode, the control electrodes of said third and fourth switching means being connected to the junction of said second memory cell and said inverter circuit;

wherein said first mentioned inverter means includes an input terminal connected to the output terminal of said second inverter means and an output terminal;

fifth and sixth switching means for connecting said first mentioned inverter means to said first and second power supply terminals; and clock pulse supplying means for enabling the first and second switching means only during a first time interval and enabling said fifth and sixth switching means only during a second time interval after said first time interval.

14. The counter according to claim 13 wherein said first mentioned inverter means and said second inverter means of the NAND means include complementary field effect transistor assembly;

wherein said first, third, fifth and sixth switching means are field effect transistors connected to those of the field effect transistors of said first and second inverter means which are of the same conductivity type;

wherein said second switching means is a field effect transistor of the same conductivity type as that of said third switching means; and said fourth switching means is a field effect transistor of the same conductivity type as that of said first switching means.

15. The counter according to claim 6 further including first and second power supply terminals across which an operating potential may be applied;

wherein said inverter means are connected between said first and second power supply terminals;

wherein said NOR Means includes a second inverter means disposed between said first and second power supply terminals and having an input terminal and an output terminal, and a first switching means disposed between the output terminal of said second inverter means and said second power supply terminal and having a control electrode which is connected to the junction of said second memory cell and said inverter circuit;

a second switching means connected to the input terminal of said first mentioned inverter means;

a third switching means for connecting the output terminal of said first mentioned inverter means to the input terminal of said second inverter means; and clock pulse supplying means for enabling said second switching means only during a first time interval and enabling said third switching means only during a second time interval after said first time interval.

16. The counter according to claim 15 wherein said first mentioned and second inverter means and said first, second and third switching means are field effect transistors of the same conductivity type.

17. The counter according to claim 16 wherein the conductivity type of said field effect transistors is P type.

18. The counter according to claim 12 further including first and second power supply terminals across which an operating potential may be applied;

wherein said NAND means includes a second inverter means having an input terminal and an output terminal, and a first switching means having a control electrode, said second inverter means and first switching means being connected in series between said first and second power supply terminals, a second switching means connected between the control electrode of said first switching means and the junction of said inverter circuit and said first memory cells;

a third switching means connected to the input terminal of said second inverter means;

a fourth switching means for connecting the input terminal of said first mentioned inverter means to the output terminal of said second inverter means included in said NAND means, said first mentioned inverter means being connected between the first and second power supply terminals; and clock pulse supplying means for enabling said second and third switching means only during a first time interval and enabling said fourth switching means

UNITED STATES PATENT OFFICE
CERTIFICATE OF CORRECTION

Patent No. 3,766,408 Dated October 16, 1973

Inventor(s) Yasoji Suzuki et al.

It is certified that error appears in the above-identified patent and that said Letters Patent are hereby corrected as shown below:

Column 16, line 55, "first" should read -- second --; line 56, "cells" should read -- cell --. Column 17, line 16, "switching" should read -- inverter --; between lines 27 and 28 insert the following paragraph -- a sixth inverter means having an output terminal and an input terminal connected to the output terminal of said fifth inverter means, the output terminal of said sixth inverter means being connected to the output terminal of said second inverter means included in said NOR means: --; line 65, after "said", insert -- fifth and sixth --; same line cancel "a"; line 66, "electrode" should read -- electrodes --. Column 18, line 27, "third" should read -- fifth --; same line "fourth" should read -- sixth --. Column 19, line 25, "third" should read -- fifth --; same line "fourth" should read -- sixth --.

Signed and sealed this 27th day of August 1974.

(SEAL)
Attest:

McCOY M. GIBSON, JR.
Attesting Officer

C. MARSHALL DANN
Commissioner of Patents

UNITED STATES PATENT OFFICE
CERTIFICATE OF CORRECTION

Patent No. 3,766,408 Dated October 16, 1973

Inventor(s) Yasoji Suzuki et al.

It is certified that error appears in the above-identified patent and that said Letters Patent are hereby corrected as shown below:

Column 16, line 55, "first" should read -- second --; line 56, "cells" should read -- cell --. Column 17, line 16, "switching" should read -- inverter --; between lines 27 and 28 insert the following paragraph -- a sixth inverter means having an output terminal and an input terminal connected to the output terminal of said fifth inverter means, the output terminal of said sixth inverter means being connected to the output terminal of said second inverter means included in said NOR means: --; line 65, after "said", insert -- fifth and sixth --; same line cancel "a"; line 66, "electrode" should read -- electrodes --. Column 18, line 27, "third" should read -- fifth --; same line "fourth" should read -- sixth --. Column 19, line 25, "third" should read -- fifth --; same line "fourth" should read -- sixth --.

Signed and sealed this 27th day of August 1974.

(SEAL)
Attest:

McCOY M. GIBSON, JR.
Attesting Officer

C. MARSHALL DANN
Commissioner of Patents